Aug. 10, 1965　　　H. F. COOK　　　3,199,622
CARGO TRUCK TRAIN
Filed Oct. 15, 1962
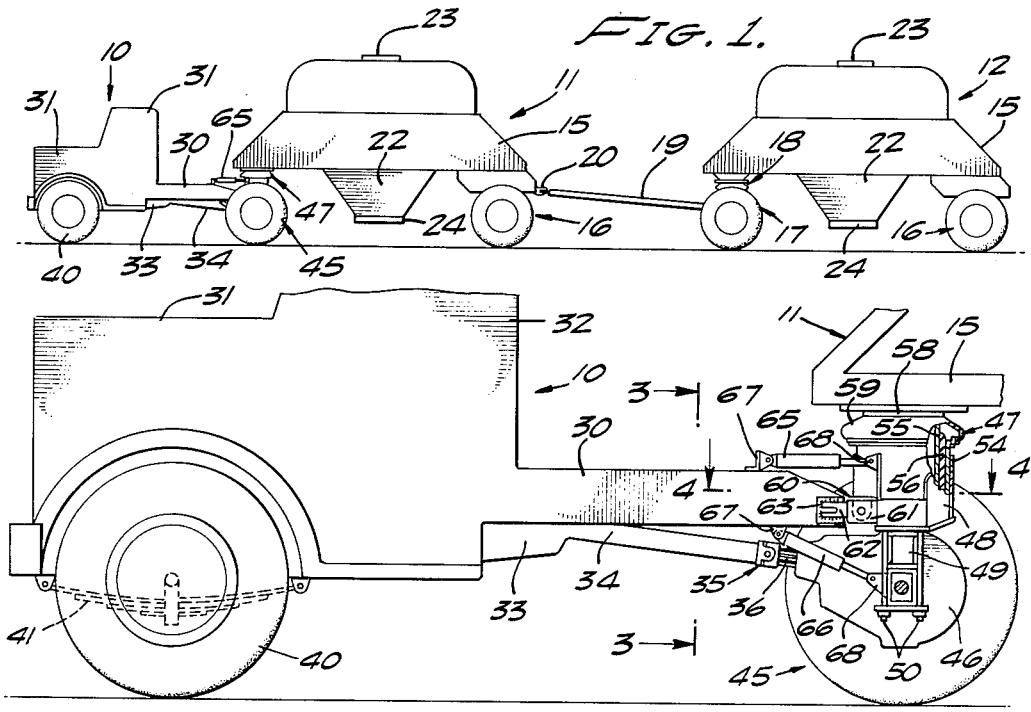
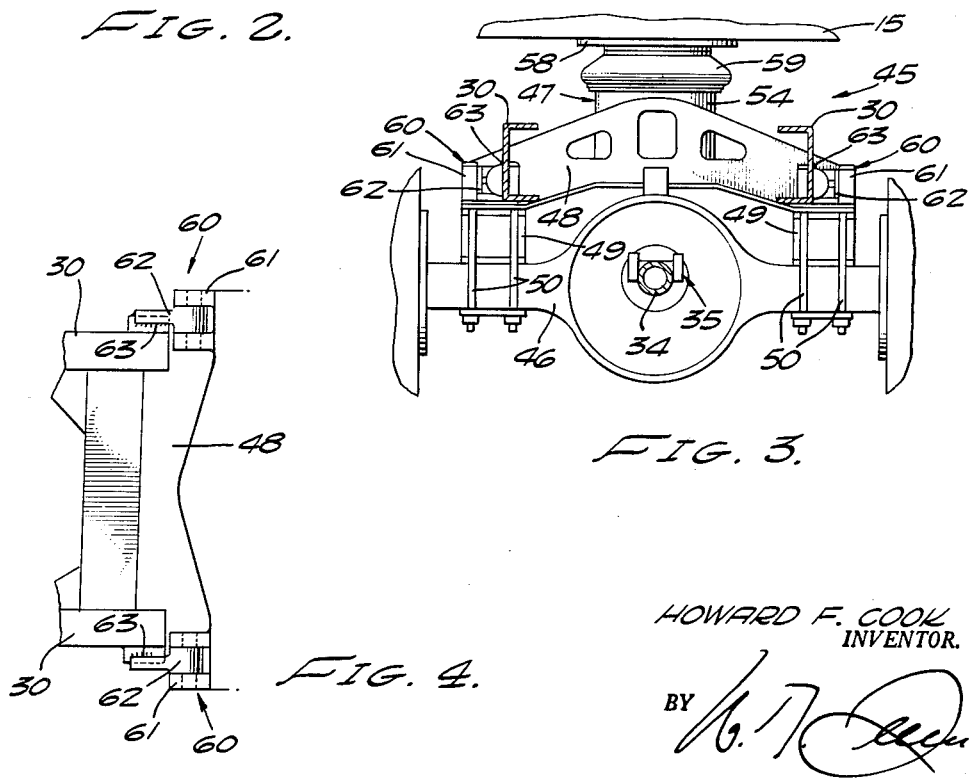
HOWARD F. COOK
INVENTOR.
BY
ATTORNEY

United States Patent Office 3,199,622
Patented Aug. 10, 1965

3,199,622
CARGO TRUCK TRAIN
Howard F. Cook, Pasadena, Calif., assignor to
Henry C. Harbers, Pasadena, Calif.
Filed Oct. 15, 1962, Ser. No. 230,411
1 Claim. (Cl. 180—14)

This invention relates to heavy-duty cargo truck trains and more particularly to a truck train featuring a tractor chassis of unique character specially designed to isolate forword components of the tractor from numerous and variable factors inherently affecting the tractor design when following prior design principles but eliminated when following the principles of the present invention.

Truck trains have been in general use for many years for hauling cargo trailers and utilizing a coupling connection between the tractor and trailer commonly known as a fifth wheel. The fifth wheel is rigidly secured to the main frame of the tractor intermediate of the forward and rear wheels. There results many undesirable and unavoidable consequences. For example, the presence or absence of the trailer greatly varies the loading on both the front and the rear wheels of the tractor, and this is true to an even greater extent depending on whether the trailer is loaded or unloaded. This widely varying load imposed on the tractor has a very marked effect on design considerations of certain major components of the tractor, including the rear wheel suspension, the tractor frame, the front wheel suspension, the steering mechanism for the tractor, the brake design, to name but a few of the more important components affected.

Additionally, the braking torques applied to the trailer wheels as well as to the tractor itself introduce load forces which heretofore have been transmitted to the tractor frame and thereby to both the front and rear suspension assemblies. The same is true with respect to inertia forces acting during braking and deceleration. The adverse influence of these various forces is so serious in larger capacity truck trains that it is highly desirable, if not mandatory, to employ power steering for the tractor. It is also necessary to employ such massive heavy-duty spring suspension systems for the front and rear wheels of the tractor to accommodate extreme operating conditions that the tractor is extremely rough riding under normal loading conditions, to say nothing of the particularly severe riding characteristics when the trailer is unloaded or detached. Such heavy-duty suspensions greatly increase the weight of the truck, add seriously to the maintenance costs and shorten the life of the equipment owing to the adverse effects of the severe road shock inherent in the use of such heavy suspension means.

Another disadvantage of conventional truck train design is the fact that when using maximum power through low speed driving connections to the tractor wheels, the front end of the tractor tends to pivot upwardly about the ring gear of the differential with the result that the driver loses steering traction and ability to control the movement of the train. Another steering problem is also present during travel over the highway particularly at higher speeds. This is because of the adverse influence of the trailer load on the tractor and its suspension system, these factors causing fluttering of the front carriage assembly with the risk of disaster if the operator is unable to slow the speed of the truck. As will be appreciated, such slowing requires application of the brakes which serves to augment the loading on the front wheels and the very factors causing wheel fluttering.

The foregoing and other adverse factors and disadvantages of prior cargo truck designs are substantially eliminated by the present invention through use of unique principles and innovations in the design of the entire truck train and more particularly the tractor itself. The primary objective which leads to the concept for these new principles was to isolate the tractor from the many variables heretofore considered inherent and inescapable in the use of a self-propelled tractor to haul one or more tandem-connected trailers. Basically and stripped to its fundamentals, one of the primary principles of this invention arrived at in carrying out the above objective resides in the fact that it is impossible to transmit loads through a hinge connection which loads are acting tranversely of the plane of the hinge leaves. By the use of this principle as hereinafter explained, it is possible to design the tractor proper without regard to certain operating conditions present in the trailer and irrespective of the presence or absence of one or more trailers. In other words, the tractor is designed primarily and basically from the standpoint of the power required to haul the intended load. Likewise, the front wheel suspension system and the steering mechanism are designed to handle only conditions uniformly present in the tractor itself and without regard to conditions in the trailer train. This is for the reason that the spring suspension for the tractor always carries only the load of the tractor itself and no part of the trailer train nor of the torque reaction of the braking system of the trailers or, in fact, of the tractor itself for reasons which will become apparent below.

In carrying out the foregoing purposes and principles, the tractor rear wheel assembly includes both the differential drive assembly and a fifth wheel assembly rigidly interconnected together with the axis for the fifth wheel arranged vertically and normal to the rear axle assembly. This rear carriage assembly has a flexible connection with the drive shaft assembly of the tractor motor and its principal and substantially sole draft connection with the tractor frame proper is through heavy-duty hinge connections having a horizontal axis extending transversely of the rear end of the tractor frame. Desirably, this hinge connection includes resilient stabilizers spaced vertically above and below the hinges proper, these stabilizers serving to limit pivotal movement about the hinge connections under adverse operating conditions, it being pointed out that it is quite feasible to omit one or both pairs of stabilizers.

By virtue of the location of the fifth wheel axis in alignment with the carriage axle and of the pivotal connection between this carriage and the tractor frame, it is readily apparent that no load operating forces of any consequence present in the trailer train can be transmitted to those portions of the tractor forwardly of its rear axle assembly. It will also be understood that the described arrangement makes possible a much shorter tractor since it is no longer necessary to leave room between the front and rear wheels for the fifth wheel assembly.

When the present design is employed with a train of trailers, the truck train may be viewed as comprised of trailers each having a rear wheel assembly fixedly attached thereto and a front wheel assembly having a rigidly attached fifth wheel unit, the foremost front wheel assembly being additionally characterized by having a differential power transmission as well as provision for hinge connections with the special tractor unit of this invention—that is, a tractor unit having only steerable front wheels and means for connecting its power takeoff with the differential built into the foremost trailer carriage.

The present invention is further characterized in that for many heavy-duty truck train applications the usual spring suspensions may be omitted except for the steerable front wheel carriage of the tractor. All other vertical shock loads being absorbed by the pneumatic tires of the several carriages and the resilient means embodied in the fifth wheel units. Sidewise forces are snubbed and absorbed by adequate provisions therefor also embodied in the design of the fifth wheel units. The need for power steering for the tractor front wheel carriage is eliminated so far as such need is based on difficult steering imposed by factors arising in the trailer train for reasons referred to above.

The saving in weight made possible by the application of the foregoing innovations and principles of the present invention is indicated by the fact that in a typical heavy-duty train involving the use of a tractor and a single trailer, approximately one thousand pounds weight reduction was achieved by eliminating unnecessary components and by restricting the size and weight of other components to that necessary to carry the substantially uniform load characteristic of the new design rather than the wide range loads typically present when following prior design principles for truck trains. The approximately one-half ton weight saving made possible by this invention provides numerous advantages. Not only is it no longer necessary to propel this additional weight over the highway, but the saving thereby achieved can be added to the payload. The lesser cost of construction materials and of manufacturing labor are very substantial, as are the savings in maintenance and servicing. The tractor is also much easier to operate and its front wheel carriage remains uniformly in contact with the roadway under all operating conditions and there is no tendency for the tractor to climb upwardly about the differential assembly. Steering is much easier and far more uniform and the front wheel springs are properly designed to provide the desired resilience for the comfort of the operator and the protection of the equipment.

Accordingly, it is a primary object of the present invention to provide an improved and unique cargo truck train featuring in particular innovations in tractor design.

Another object of the invention is the provision of a truck tractor having its rear wheel carriage hingedly connected to the tractor frame on an axis extending transversely of the frame.

Another object of the invention is the provision of a truck tractor having a unitary rear wheel carriage assembly having rigidly fixed thereto a differential power assembly for driving the same as well as a fifth wheel unit.

Another object of the invention is the provision of a truck tractor having a fifth wheel assembly so supported and associated with the rear wheel carriage assembly that load forces acting on the fifth wheel assembly and arising from one or more trailers operatively connected thereto are isolated from the tractor frame proper and from the steerable front wheels of the tractor.

Another object of the invention is the provision of a heavy-duty truck tractor train wherein the forward end of the trailer is pivotally supported on a fifth wheel assembly overlying the axis of the rear wheel carriage for the tractor, the latter being so connected to the tractor frame that varying load conditions of the trailers, changes in momentum of the truck train, and braking torque forces and other factors do not affect loading conditions on the tractor frame or on the steerable wheels of the tractor.

Another object of the invention is the provision of a truck tractor design having a steerable wheel carriage provided with resilient suspension means designed to carry the normal forces imposed thereon by the tractor per se.

These and other more specific objects will appear upon reading the following specification and claim and upon considering in connection therewith the attached drawings to which they relate.

Referring now to the drawings in which a preferred embodiment of the invention is illustrated:

FIGURE 1 is a side elevational view of one preferred embodiment of a truck cargo train designed according to the present invention;

FIGURE 2 is a fragmentary elevational view on an enlarged scale of the tractor proper, portions of the rear carriage assembly being broken away to show the structural details;

FIGURE 3 is a fragmentary cross-sectional view taken along line 3—3 on FIGURE 2; and FIGURE 4 is a fragmentary cross-sectional view through the rear carriage assembly taken along line 4—4 on FIGURE 2.

Referring more particularly to FIGURE 1, there is shown a heavy-duty truck train comprising a tractor designated generally 10 and two tandem-connected trailers designated generally 11 and 12. For purposes of illustration, trailers 11 and 12 are shown as having a rigid frame 15 supported at its rear end by a rigidly connected rear wheel carriage 16. Rearmost trailer 12 has a front wheel carriage 17 pivotally connected to the forward end of frame 15 by a vertical axis fifth wheel assembly 18. Carriage 17 is provided with a draw bar 19 of generally V-shape having its wider rear end pivotally connected to spaced points crosswise of the carriage frame and its apex or forward end detachably coupled to trailer 11 by any suitable coupling means 20. By way of illustration, the cargo carrying means for each of the trailers comprises a hopper 22 having a closed filling opening 23 and a normally closed discharge gate 24.

Referring now more particularly to FIGURE 2, it is pointed out that tractor 10 is provided with a relatively short, horizontally disposed main frame 30 having the usual internal combustion engine secured to its forward end, the engine not being shown but understood as enclosed within hood 31 in accordance with customary practice. As shown, hood 31 is located forwardly of the driver's cab 32. The motor has a power takeoff or drive shaft 34 from the usual transmission or torque converter 33, shaft 34 being provided with a U-joint 35 having a sliding connection with the splined end 36 of the power input to a differential to be described presently.

The steerable front wheels 40 of the tractor may be of any suitable type so long as embodying the features of this invention and are connected in any suitable manner with the usual steering mechanism for the tractor. As herein shown, each front wheel is resiliently connected to the tractor frame as by the relatively light-duty leaf spring 41. Of importance is the fact that whether this resilient connection 41 comprises a leaf spring, an air bellows, a torsion spring or any other suitable type, it is designed to carry only the normal operating load imposed on the front wheels 40 by the tractor itself and without regard to the presence or absence of a trailer train and without regard to the loaded or unloaded condition of the train. In consequence, spring 41 may be considerably lighter in weight and of much smaller capacity than in prior designs wherein consideration must be given to the truck train and the widely varying operation factors associated therewith.

Referring now more particularly to FIGURES 2, 3 and 4, the construction and functional aspects of the rear carriage assembly designated generally 45 will be described. This unitary assembly will be understood as including the carriage proper including housing 46 for the carriage axle as well as the differential power transmitting means of any suitable construction enclosed within the enlarged central portion of housing 46. In addition, rear carriage assembly 45 includes a rigidly attached fifth wheel unit 47. This fifth wheel is shown located directly above a bolster 48 overlying and parallel to axle housing 46 and is rigidly secured thereto through spacer members 49 by clamping bolts 50.

The fifth wheel unit proper 47 may be of any suitable design and construction, that shown in Broughton et al. Patent 2,960,350, issued November 15, 1960, being particularly suitable and indicated in general in the present drawing. This assembly will be understood as including a pair of loosely telescoped tubular main body members 54, 55 and an intervening thick sleeve 56 of elastomeric material. The lower end of outer tube 54 is rigidly secured to bolster 48 whereas inner tube 55 projects upwardly and is connected to a plate 58 detachably secured to the forward end of trailer frame 15. The resilient kingpin assembly (not shown) will be understood as interconnecting the interior of the two tubular sections 54, 55 and includes a suitable heavy-duty thrust bearing desirably having resilient properties. Interconnecting the upper adjacent ends of members 54 and 55, there is preferably provided a flexible dust boot 59 of rubberized fabric or the like.

The sole draft connection between carriage assembly 45 and main frame 30 of the tractor, as herein shown by way of example, comprises a pair of hinges 60, 60. Desirably, hinges 60 are of the entrapped rubber torsion type having limited freedom of movement about aligned horizontal axes extending transversely of tractor frame 10 and parallel to the axles of carriage 45. The constructional details of the hinges are not shown herein since the particular type of hinge employed is not of the essence. In general, the hinge construction herein illustrated conforms to that disclosed in detail in a United States patent issued to Henry C. Harbers et al. on August 15, 1961, No. 2,996,313. Accordingly, reference may be had to that patent for a disclosure of the constructional details of hinge 60.

It will be understood that the hinge comprises a generally rectangular outer housing 61 rigidly secured, as by welding, to the forward faces of bolster 48 near its opposite ends. The other principal component of the hinge includes a T-shaped member 62, the stem of which is rigidly secured, as by welding 63, to the sides of tractor frame 30. The opposite ends of the head portion of each T-shaped member 62 are socketed in rubber collars assembled within ends of hinge housing 61 and secured there under radially applied pressure. It will therefore be understood that the axis of hinges 60 is located along the longitudinal center line of the head portion of T-shaped members 62. Owing to the fact that the entrapped rubber collars separating the head portion of the hinge from its main housing 61 are surrounded by the metal components and held trapped under pressure thereby, it will be appreciated that the two principal portions 61, 62 of the hinge are held resiliently against relative pivotal movement in a vertical plane by the high torsional resistance provided by the intervening rubber collars. This torsional resistance strongly resists any tendency of the rear carriage assembly 45 to pivot about the rear end of tractor frame 30, yet permits such pivoting to the extent necessary to isolate the tractor from the effects of load and operating factors within the trailer train. All draft forces necessary to provide a hauling connection between the trailer train and the tractor are transmitted through hinges 60 as well as through the described rubber collars interposed between the two principal members 61, 62 of the hinge.

If desired, and to provide additional stabilizing ability, the tractor is preferably provided with upper and lower pairs of resilient stabilizers 65, 66. As herein shown, these stabilizers comprise an outer tubular member enclosing a piston member urged toward its retracted position by an intervening heavy-duty spring. It will be understood that the stabilizers may be of any suitable construction. The opposite ends of the stabilizers are pivotally connected to the tractor, as by brackets 67, and to carriage assembly 45, as by brackets 68.

It will be understood that the input to the power differential for the rear carriage includes a splined shaft 66 having axial sliding engagement with the complementally shaped rear half of U-coupling 35. This assembly provides a flexible connection between drive shaft 34 and the power differential thereby permitting the rear carriage to pivot slightly about the axis of hinges 60 while maintaining a power driving connection with drive shaft 34.

Normally trailer 11 will remain connected to the top of the fifth wheel assembly 47 by means of coupling 58. However, coupling 58 is preferably provided with separable fasteners, such as bolts, cap screws or the like, by which frame 15 of trailer 11 can be disconnected from the top of its associated fifth wheel. When so disconnected, tractor 10 may be driven in the usual manner.

Although no brake actuators are shown, it is pointed out that the rear carriages of both the tractor and each of the trailers include brakes operated in any suitable manner as by the pneumatically operated brake boosters of conventional design.

While the particular cargo truck train herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claim.

I claim:

A tractor suitable for hauling trailers and the like, said tractor having a motor-supporting main frame, a carriage having steerable front wheels underlying the front end of said frame and connected thereto through resilient suspension means expressly designed to carry only the load imposed thereon by said tractor and inadequate for supporting loads normally imposed on front tractor springs by a cargo trailer coupled to the tractor, a carriage assembly extending across the rear end of said tractor frame having fifth wheel means secured thereto, differential power transmitting means mounted on said carriage assembly to drive the wheels thereof, flexible power transmitting means between said motor and said differential power means, and entrapped-rubber torsion hinge means having a horizontal axis extending transversely of said frame providing the main draft connection between said carriage assembly and the rear end of said tractor frame and effective to substantially isolate trailer load forces from being transmitted to said front tractor carriage and its associated resilient suspension means while resiliently resisting all except limited pivotal movements of said carriage assembly relative to the rear end of said tractor, said entrapped-rubber torsion hinge means being effective to transmit the entire weight of the rear end of said tractor to said carriage assembly for support thereby, pairs of resilient stabilizers spaced vertically above and below said torsion hinge means having one end of each stabilizer pivotally connected to the tractor frame and the other end of each pivotally connected to said carriage assembly closely adjacent a vertical plane through a wheel axis thereof, said stabilizers cooperating with said torsion hinge means in holding said carriage assembly movably connected to the rear of the tractor frame with the axis of the fifth wheel means upright and normal to a horizontal plane through the tractor frame.

References Cited by the Examiner

UNITED STATES PATENTS

| | | | |
|---|---|---|---|
| 1,018,248 | 2/12 | Martin | 180—11 |
| 1,194,255 | 8/16 | Sulton | 180—11 |
| 1,296,655 | 3/19 | Gurney | 180—14 |
| 1,323,739 | 12/19 | Buck | 180—11 |
| 1,564,740 | 12/25 | Winn | 180—12 |
| 1,880,842 | 11/32 | Curtiss | 180—11 X |
| 2,852,273 | 9/58 | Hudson | 280—408 X |
| 2,960,350 | 11/60 | Broughton et al. | 280—136 |
| 2,996,313 | 8/61 | Harbers et al. | 280—485 |

A. HARRY LEVY, *Primary Examiner.*